(12) United States Patent
Vellanikkaran et al.

(10) Patent No.: US 12,202,357 B2
(45) Date of Patent: Jan. 21, 2025

(54) HIGH-VOLTAGE (HV) ELECTRICAL DEVICE AND A SAFETY CIRCUIT FOR A HV ELECTRICAL SYSTEM

(71) Applicants: Robert Bosch GmbH, Stuttgart (DE); Robert Bosch Engineering and Business Solutions Private Limited, Bangalore (IN)

(72) Inventors: George Vellanikkaran, Coimbatore (IN); Vemula Nagaraj Prajwal, Bangalore (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 40 days.

(21) Appl. No.: 18/078,588

(22) Filed: Dec. 9, 2022

(65) Prior Publication Data

US 2023/0211669 A1    Jul. 6, 2023

(30) Foreign Application Priority Data

Dec. 30, 2021    (IN) .............................. 202141061735

(51) Int. Cl.
*B60L 3/04*    (2006.01)
*B60L 3/00*    (2019.01)

(52) U.S. Cl.
CPC .................. *B60L 3/04* (2013.01); *B60L 3/003* (2013.01); *B60L 3/0046* (2013.01); *B60L 3/0061* (2013.01); *B60L 3/0084* (2013.01)

(58) Field of Classification Search
CPC .......... B60L 3/04; B60L 3/003; B60L 3/0061; B60L 3/0084
See application file for complete search history.

(56) References Cited

U.S. PATENT DOCUMENTS

| 4,869,688 A | * | 9/1989 | Merio | ..................... H02H 9/045 320/105 |
| 2012/0123622 A1 | * | 5/2012 | Miyazaki | .............. B60L 3/0061 903/906 |

FOREIGN PATENT DOCUMENTS

| CN | 110843529 A | | 2/2020 | |
| WO | WO-2012007329 A2 | * | 1/2012 | .............. B60L 3/003 |

* cited by examiner

*Primary Examiner* — Jared Fureman
*Assistant Examiner* — Duc M Pham
(74) *Attorney, Agent, or Firm* — Maginot, Moore & Beck LLP

(57) ABSTRACT

A safety circuit for a high-voltage (HV) electrical system and a HV electrical device are disclosed. The HV electrical system includes one or more one HV electrical devices. Each HV electrical device includes a low-voltage electrical line. A resistor is connected in parallel to the low-voltage electrical line. A controller is connected to the HV electrical device through the low-voltage electrical line.

8 Claims, 3 Drawing Sheets

HIGH-VOLTAGE (HV) ELECTRICAL DEVICE AND A SAFETY CIRCUIT FOR A HV ELECTRICAL SYSTEM

This application claims priority under 35 U.S.C. § 119 to patent application no. 202141061735, filed on Dec. 30, 2021 in India, the disclosure of which is incorporated herein by reference in its entirety.

The present disclosure relates to a high-voltage electrical device and a safety circuit for a high-voltage (HV) electrical system. More particularly, it relates to a HV electrical system in an electrical or hybrid vehicle.

BACKGROUND

High-voltage electrical devices are increasingly being used in the vehicles due to increase in electrification in the automobile industry. Various safety measures need to be taken when using HV electrical devices in a vehicle. Especially, disconnection of HV electrical devices is a serious threat. Identification of such disconnection and taking an appropriate safety step is very important.

CN110843529 discloses a high-voltage interlocking fault self-diagnosis circuit, a control method and a new energy automobile. The patent publication discloses the following. When there is a disconnect of high voltage interlock, a switch will open depending on the component (K1, K2, K3, etc.,) and an LED will be turned on to indicate about the event.

SUMMARY

The disclosure discloses a high-voltage (HV) electrical device. Examples of the HV electrical device include, but not limited to, a HV plug, a HV charger, and a DC-DC converter, a HV Motor Control Unit, a HV Motor, a HV On-board Charger, a HV AC Compressor, a HV Battery. The HV electrical device may be a part of an electric vehicle or a hybrid vehicle.

The HV electrical device comprises a connector for connecting to a HV line. The HV electrical device also has a low-voltage line connected to a controller. A resistor is connected in parallel to the low-voltage line.

The disclosure also discloses a safety circuit for a high-voltage (HV) electrical system. The HV electrical system may be a part of a vehicle such as electric vehicle or a hybrid vehicle. The HV electrical system comprises one or more HV electrical devices. The HV electrical device comprises a low-voltage line. A resistor is connected in parallel to the low-voltage line. A controller is connected to the HV electrical device through the low-voltage line. The controller identifies disconnection of the HV electrical device based on variation in current drawn in the low-voltage line.

The controller selectively turns on a limp-home mode, a drive stop mode or an emergency shut down mode, depending on the criticality of the disconnected HV component and the current state of the vehicle.

BRIEF DESCRIPTION OF THE DRAWINGS

An embodiment of the disclosure is described with reference to the following accompanying drawings.

DETAILED DESCRIPTION

Figure 1:
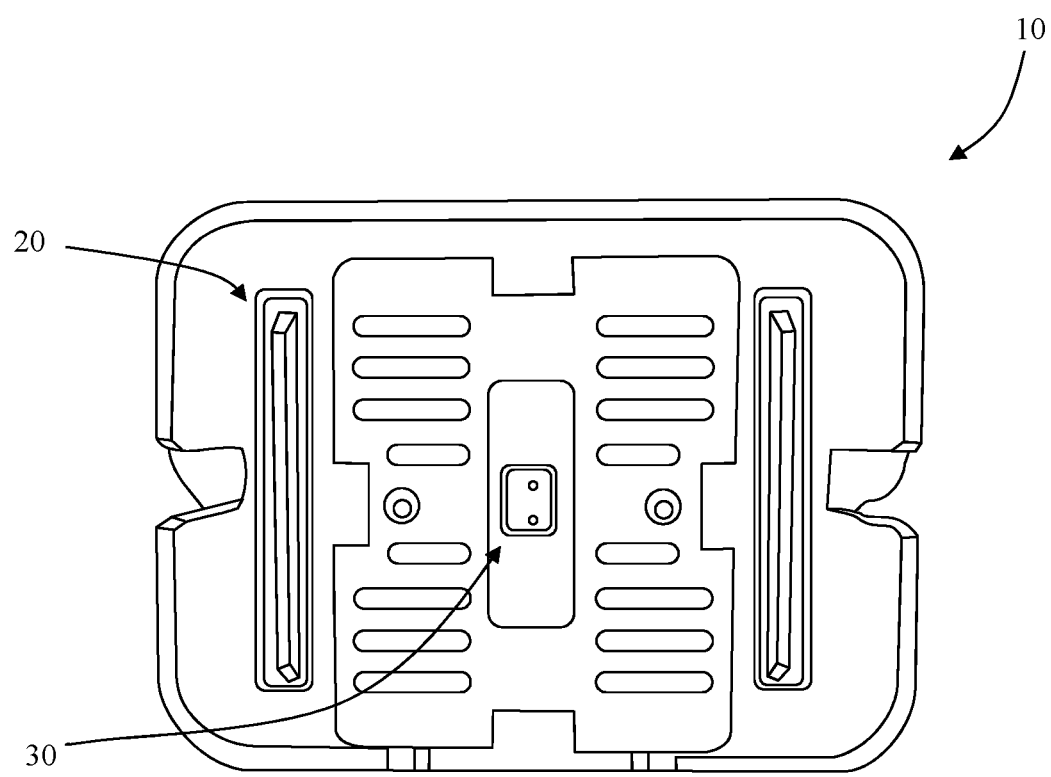
FIG. 1 shows a schematic block diagram of a high-voltage (HV) electric device, according to an embodiment of the present disclosure.

FIG. 1 shows a schematic block diagram of a high-voltage (HV) electric device, according to an embodiment of the present disclosure. The high-voltage (HV) electrical device is any electrical device which operates with high voltage and connected to a high voltage line. Examples of the HV electrical device include, but not limited to, a HV plug, a HV charger, and a DC-DC converter, a HV Motor Control Unit, a HV Motor, a HV On-board Charger, a HV AC Compressor, a HV Battery. The HV electrical device 10 may be used in many applications, but not limited to, an electric vehicle or a hybrid vehicle.

The HV electrical device 10 comprises a connector 20 for connecting to a HV line. The HV electrical device 10 also has a low-voltage line 30 connected to a controller. The controller may or may not be a part of the HV electrical device 10. For instance, the controller may be a part of the electrical vehicle. A resistor is connected in parallel to the low-voltage line 30. In other words, the HV electrical device 10 is connected to the low-voltage line 30 through the resistor. One or more HV electrical devices 10 are connected to a HV line. The HV electrical devices 10 are also connected to the low-voltage line 30 through respective resistors. The resistance value of the resistors connected to each HV electrical device 10 is different. When there is a disconnection of one or more HV electrical devices 10, the disconnected HV electrical device 10 can be identified based on the variation in the current drawn in the low-voltage line. Hence the disconnection in high-voltage interlock as well as precise identification of the disconnected HV electrical device 10 is possible. As a result, appropriate safety measures can be taken immediately. Therefore, safety of the user is improved.

Figure 2:
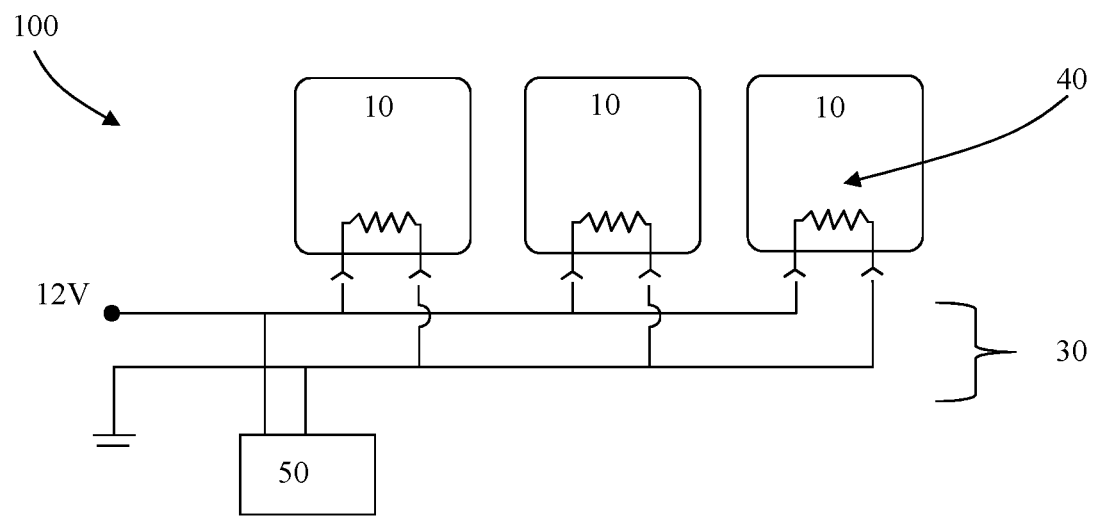
FIG. 2 shows a schematic circuit diagram of a HV electrical system employing a safety circuit, according to an embodiment of the present disclosure.

FIG. 2 shows a schematic circuit diagram of a HV electrical system 20 employing a safety circuit. The HV electrical system is a part of a vehicle such as electric vehicle or a hybrid vehicle. The HV electrical system comprises one or more HV electrical devices 10 such as a HV plug, a HV charger, and a DC-DC converter, a HV Motor Control Unit, a HV Motor, a HV On-board Charger, a HV AC Compressor, a HV Battery, etc.

The safety circuit 100 of the HV electrical system comprises a low-voltage line 30. A resistor 40 is connected in parallel to the low-voltage line 30. In other words, the HV electrical device 10 is connected to the low-voltage line 30 through the resistor 40.

In an embodiment of the disclosure, each HV electrical device 30 has integral resistor 40 of different resistance value. A controller 50 is connected to the HV electrical devices 10 through the low-voltage line 30. The controller 50 may be a part of the vehicle such as electrical vehicle or hybrid vehicle. The controller 50 is connected to a low-voltage battery.

The controller 50 identifies the disconnection of one or more HV electrical devices 10, based on the variation in the current drawn in the low-voltage line 30. When all the HV electrical devices 10 are connected and working, the controller 50 knows the current drawn normally in the low-voltage line 30. When a specific HV electrical device 10 is disconnected, the current variation can be detected and based on the variation in the current, the controller 50 identifies the disconnected HV electrical device 10 with the help of the pre-known resistance value of the corresponding resistor 40. For example, the effective resistance and the total current drawn in the low-voltage line 30, when all the HV electrical devices 10 are connected is stored beforehand by the controller 50. When a particular HV electrical device 10 is disconnected, the variation in the current drawn in the low-voltage line 30 is detected and accordingly, the disconnected HV electrical device 10 is precisely identified.

Hence the disconnection in high-voltage interlock as well as precise identification of the disconnected HV electrical device 10 is possible. As a result, appropriate safety measures can be taken immediately which improves the overall safety of the HV electrical system.

Figure 3:
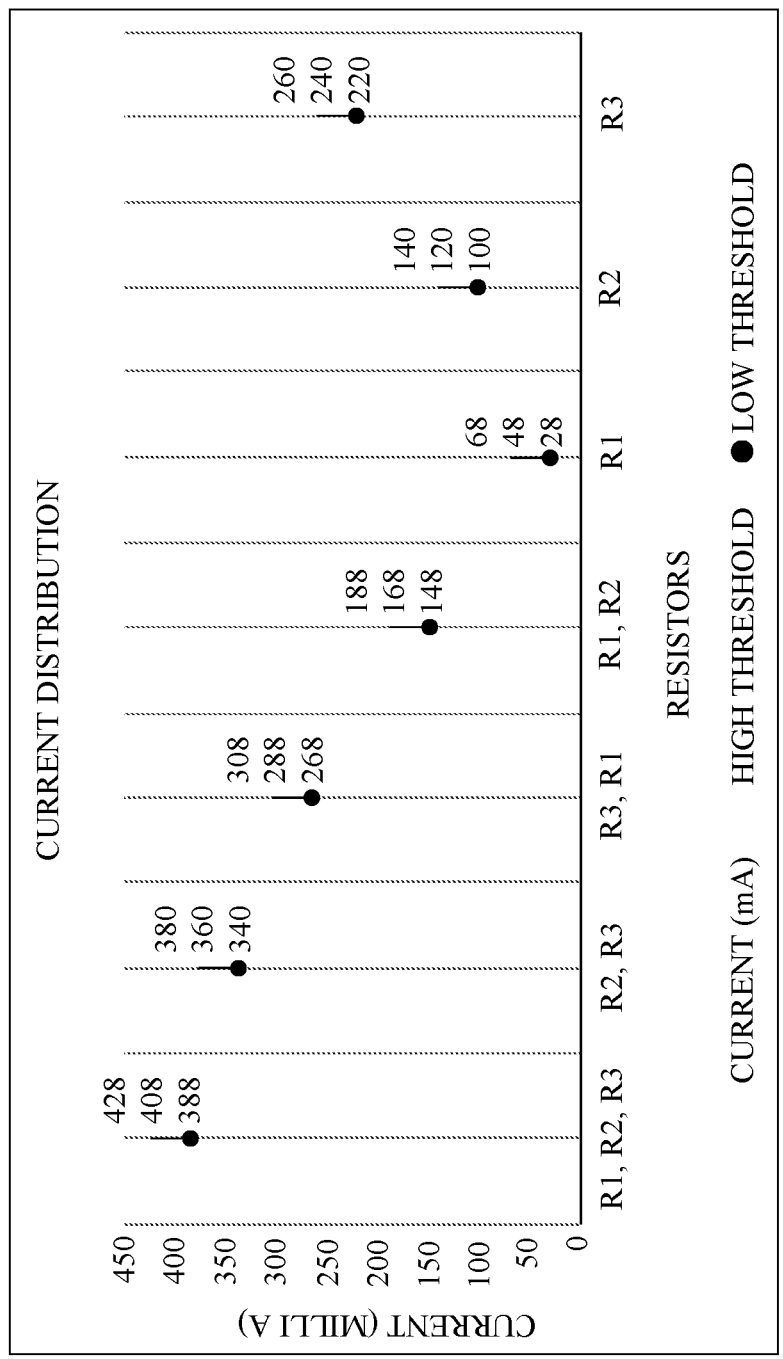
FIG. 3 shows a graph showing the relation between current drawn and set of resistors of HV electrical devices, according to an embodiment of the present disclosure.

In an embodiment of the disclosure, the different current values through the low-voltage line 30 are calibrated with a certain threshold range to identify which of the HV electrical device 10 has is triggered the High Voltage Interlock fault. FIG. 3 shows a graph showing the relation between current drawn and set of resistors of HV electrical devices 10, according to an embodiment of the present disclosure. The same relation is explained in a below table.

| Possible situations | Effective Resistance (Ω) | Current (A) | Current (mA) | High Threshold | Low threshold |
| --- | --- | --- | --- | --- | --- |
| R1, R2, R3 | 29.41 | 0.408 | 408 | 428 | 388 |
| R2, R3 | 33.33 | 0.36 | 360 | 380 | 340 |
| R3, R1 | 41.67 | 0.288 | 288 | 308 | 268 |
| R1, R2 | 71.43 | 0.168 | 168 | 188 | 148 |
| R1 | 250.00 | 0.048 | 48 | 68 | 28 |
| R2 | 100.00 | 0.12 | 120 | 140 | 100 |
| R3 | 50.00 | 0.24 | 240 | 260 | 220 |
| No resistors | No resistance | Limited by VCU | Limited by VCU | | |

In this example, there are three HV electrical devices 10 are connected to the low-voltage line 30, through their respective resistors R1, R2, R3 40. The controller 50 knows the lower and upper threshold of current values corresponding to each HV electrical device 10 beforehand. When a specific HV electrical device 10 is disconnected, the variation in current is detected by the controller 50 and it is checked with the different threshold ranges of current corresponding to different HV electrical devices 10 and their resistors 40. For example, as shown in FIG. 3, the lower range and higher threshold of current corresponding to 3rd HV electrical device or the corresponding resistor R3 is 220 and 260 mA, respectively. The current drawn is detected as 240 mA. Hence the controller 50 identifies that there is a disconnection of 3rd HV electrical device 10.

Depending on which HV electrical device 10 has triggered HVIL fault and the resistor value, the current flow in the low voltage line 30 changes, which is detected by the controller 50 and accordingly appropriate safety measures are taken.

In an embodiment of the disclosure, where the safety circuit 100 is employed in a vehicular application, the controller 50 selectively turns on a limp-home mode, a drive stop mode or an emergency shut down mode, depending on the criticality of the disconnected HV electrical device 10 and the current state of the vehicle. For instance, when the criticality of the disconnected HV electrical device 10 is less, then the controller 50 turns on the limp-home mode, so that the vehicle can be driven with limited functionalities to a nearby garage or service center. When the criticality of the disconnected HV electrical device is medium, the drive stop mode is turned on by the controller 50, where vehicle can be driven, and certain electrical functions like AC, etc., are turned off. If the criticality of the disconnected HV electrical device 10 is high, the emergency shut down mode is turned on by the controller 50 so that all the functionalities are switched off and vehicle is also shut down to improve the safety.

It should be understood that embodiments explained in the description above are only illustrative and do not limit the scope of this disclosure. Many such embodiments and other modifications and changes in the embodiment explained in the description are envisaged. The scope of the disclosure is only limited by the scope of the claims.

What is claimed is:

1. A high-voltage (HV) electrical device comprising:
   a connector configured to connect to a HV line and a low-voltage electrical line, the low-voltage electrical line operably connected to a controller; and
   a resistor connected in parallel to the low-voltage electrical line,
   wherein the controller is configured to identify disconnection of the HV electrical device based on a variation in current drawn in the low-voltage electrical line.

2. The HV electrical device as claimed in claim 1, wherein the HV electrical device is one of a HV plug, a HV charger, and a DC-DC converter, a HV Motor Control Unit, a HV Motor, a HV On-board Charger, a HV AC Compressor, and a HV Battery.

3. The HV electrical device as claimed in claim 1, wherein the HV electrical device is part of one of an electric vehicle and a hybrid vehicle.

4. A safety circuit for a high-voltage (HV) electrical system, comprising:
   at least one HV electrical device;
   a low-voltage electrical line;
   a resistor connected in parallel to the low-voltage electrical line; and
   a controller connected to the at least one HV electrical device through the low-voltage electrical line,
   wherein the controller is configured to identify disconnection of the at least one HV electrical device based on a variation in current drawn in the low-voltage electrical line.

5. The safety circuit as claimed in claim 4, wherein the HV electrical system is part of a vehicle.

6. The safety circuit as claimed in claim 5, wherein the vehicle is one of an electric vehicle and a hybrid vehicle.

7. The safety circuit as claimed in claim 5, wherein the controller is further configured to selectively stop the vehicle based on a criticality of the disconnected at least one HV electrical device.

8. The safety circuit as claimed in claim 5, wherein the controller is configured to selectively turn on a limp-home mode, a drive stop mode, or an emergency shut down mode, depending on a criticality of the disconnected at least one HV electrical device and a current state of the vehicle.

\* \* \* \* \*